US012193012B2

(12) United States Patent
He et al.

(10) Patent No.: US 12,193,012 B2
(45) Date of Patent: Jan. 7, 2025

(54) METHODS AND APPARATUS FOR SUB-BAND-BASED PDCCH HOPPING IN WIRELESS COMMUNICATION

(71) Applicant: Apple Inc., Cupertino, CA (US)

(72) Inventors: Hong He, San Jose, CA (US); Chunhai Yao, Beijing (CN); Dawei Zhang, Saratoga, CA (US); Haitong Sun, Cupertino, CA (US); Jie Cui, San Jose, CA (US); Wei Zeng, Saratoga, CA (US); Yang Tang, San Jose, CA (US); Yushu Zhang, Beijing (CN); Zhibin Wu, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/441,948

(22) PCT Filed: May 14, 2020

(86) PCT No.: PCT/CN2020/090132
§ 371 (c)(1),
(2) Date: Sep. 22, 2021

(87) PCT Pub. No.: WO2021/226902
PCT Pub. Date: Nov. 18, 2021

(65) Prior Publication Data
US 2023/0055018 A1    Feb. 23, 2023

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0012* (2013.01); *H04W 24/08* (2013.01); *H04W 72/0453* (2013.01)

(58) Field of Classification Search
CPC . H04W 72/23; H04W 24/08; H04W 72/0453; H04L 5/0012
See application file for complete search history.

(56) References Cited

U.S. PATENT DOCUMENTS

| 11,032,808 | B2 | 6/2021 | Sun et al. |
| 2004/0179680 | A1* | 9/2004 | Liardet .................... G06F 7/72 380/30 |

(Continued)

FOREIGN PATENT DOCUMENTS

| CA | 3114819 A1 | 4/2020 |
| CN | 108886751 A | 11/2018 |

(Continued)

OTHER PUBLICATIONS

International Search Report mailed Feb. 18, 2021 for Appl. No. PCT/CN2020/090132; 4 pages.

(Continued)

*Primary Examiner* — Natasha W Cosme
(74) *Attorney, Agent, or Firm* — Sterne, Kessler, Goldstein & Fox P.L.L.C.

(57) ABSTRACT

An approach for wireless communications to support reduced capability New Radio (NR) with larger available control resource sets (CORESET) bandwidths. Examples include a frequency-hopping CORESET with a predefined hopping pattern configured by higher layers, such as RRC signaling or MAC Control Element (CE) on a per CORESET per UE or purely per UE basis. Frequency hopping patterns for CORESET transmissions include the use of PRBs for CORESETs that are mirrored with respect to the central frequency of active bandwidth part (BWP), and the use of a random parameter to step through the frequency pattern. The sub-band location of the physical downlink shared channel that is scheduled by the physical downlink (Continued)

control channel may be indicated using the DCI format, or may be based on a last slot for PDCCH transmission.

20 Claims, 11 Drawing Sheets

(51) Int. Cl.
  *H04W 24/08* (2009.01)
  *H04W 72/0453* (2023.01)

(56) References Cited

U.S. PATENT DOCUMENTS

| | | | |
|---|---|---|---|
| 2014/0029565 A1* | 1/2014 | Kim | H04W 72/23 370/329 |
| 2018/0279272 A1* | 9/2018 | Bhattad | H04W 24/08 |
| 2018/0288747 A1 | 10/2018 | Sun et al. | |
| 2019/0059081 A1* | 2/2019 | Medles | H04B 1/7143 |
| 2019/0150121 A1 | 5/2019 | Abdoli et al. | |
| 2020/0077432 A1 | 3/2020 | Xiong et al. | |
| 2020/0305094 A1 | 9/2020 | Ouchi et al. | |
| 2021/0219301 A1 | 7/2021 | Shen | |
| 2021/0345122 A1* | 11/2021 | Liu | H04L 5/0053 |

FOREIGN PATENT DOCUMENTS

| | | |
|---|---|---|
| CN | 110301100 A | 10/2019 |
| CN | 110476388 A | 11/2019 |
| CN | 110972320 A | 4/2020 |
| CN | 111034320 A | 4/2020 |
| EP | 3439374 A1 | 2/2019 |

OTHER PUBLICATIONS

Written Opinion mailed Feb. 18, 2021 for Appl. No. PCT/CN2020/090132; 4 pages.
LG Electronics, 3GPP TSG RAN WG1 Meeting #79 R1-144893, EPDCCH and PDSCH related issues for MTC, Nov. 21, 2014 (Nov. 21, 2014), sections 2-4; 5 pages.
Qualcomm Incorporated, 3GPP TSG-RAN WG1 Meeting AH 1801 R1-1800876, DL/UL Scheduling, Processing Time and HARQ management, Jan. 26, 2018 (Jan. 26, 2018), the whole document; 6 pages.
Ericsson, 3GPP TSG RAN Meeting #86 RP-193238, New SID on Support of Reduced Capability NR Devices, Dec. 2019; 5 pages.
3GPP TS 38.213 V16.1.0, 3rd Generation Partnership Project; Technical Specification Group Radio Access Network; NR; Physical layer procedures for control (Release 16), Mar. 2020; 156 pages.
"Further Details on Narrowband Configuration for MTG UE," R1-155857, 3GPP TSG RAN WGI Meeting #82bis, Malmo, Sweden; Oct. 5, 2015, 3 pages.
Extended European Search Report directed to related European Application No. EP 20 934 932.3, mailed Dec. 21, 2023; 11 pages.

* cited by examiner

500

$$n_{PRB} \in \left\{ \left\lfloor \frac{m}{2} \right\rfloor, N^{size}_{BWP} - \left\lfloor \frac{m}{2} \right\rfloor - 1 \right\}$$

THE FIRST PRB OF THE CORESET CONFIGURED BY RRC: $\left\lfloor \frac{m}{2} \right\rfloor$ ACTIVE BWP SIZE: $N^{size}_{BWP}$

THE PDCCH MONITORING OCCASION INDEX $$if \left( \left\lfloor \frac{i}{X} \right\rfloor \bmod 2 \right) = 0$$

$$if \left( \left\lfloor \frac{i}{X} \right\rfloor \bmod 2 \right) = 1$$

X: CONFIGURED BY RRC

Figure 5

METHODS AND APPARATUS FOR SUB-BAND-BASED PDCCH HOPPING IN WIRELESS COMMUNICATION

CROSS REFERENCE TO RELATED APPLICATIONS

This application is a National Stage application under 35 U.S.C. § 371 of International Application No. PCT/CN2020/090132, having an International Filing Date of May 14, 2020.

FIELD

Various aspects generally may relate to the field of wireless communications.

SUMMARY

An aspect is described that is a user equipment (UE) having a reduced bandwidth capability. The UE comprises a receiver and processor circuitry. The receiver is configured to receive control resource set (CORESET) transmissions from a gNB, the CORESET transmissions following a frequency hopping pattern across a set of sub-bands, each sub-band of the set of sub-bands being a subset of a system bandwidth available from the gNB. The processor circuitry is configured to determine a sub-band location associated with the CORESET transmissions, the sub-band location determined from information received from a physical downlink control channel (PDCCH) transmission.

Another aspect is a method for communication by a user equipment (UE) with reduced bandwidth capability, where the method includes the following steps. The method includes receiving CORESET transmissions from a gNB, where the CORESET transmissions follow a frequency hopping pattern across a set of sub-bands, with each sub-band of the set of sub-bands being a subset of a system bandwidth available from the gNB. The method further includes the step of determining a sub-band location associated with the CORESET transmissions, the sub-band location determined from information received from a physical downlink control channel (PDCCH) transmission.

Another aspect is described that is computer-readable media (CRM) comprising computer instructions, where upon execution of the instructions by one or more processors of an electronic device, causes the electronic device to perform various steps. These steps include receiving CORESET transmissions from a gNB, where the CORESET transmissions follow a frequency hopping pattern across a set of sub-bands, with each sub-band of the set of sub-bands being a subset of a system bandwidth available from the gNB. The steps further include determining a sub-band location associated with the CORESET transmissions, the sub-band location determined from information received from a physical downlink control channel (PDCCH) transmission.

BRIEF DESCRIPTION OF THE FIGURES

FIG. 5 illustrates equations that define monitoring occasions, in accordance with some aspects.

Figure 1:
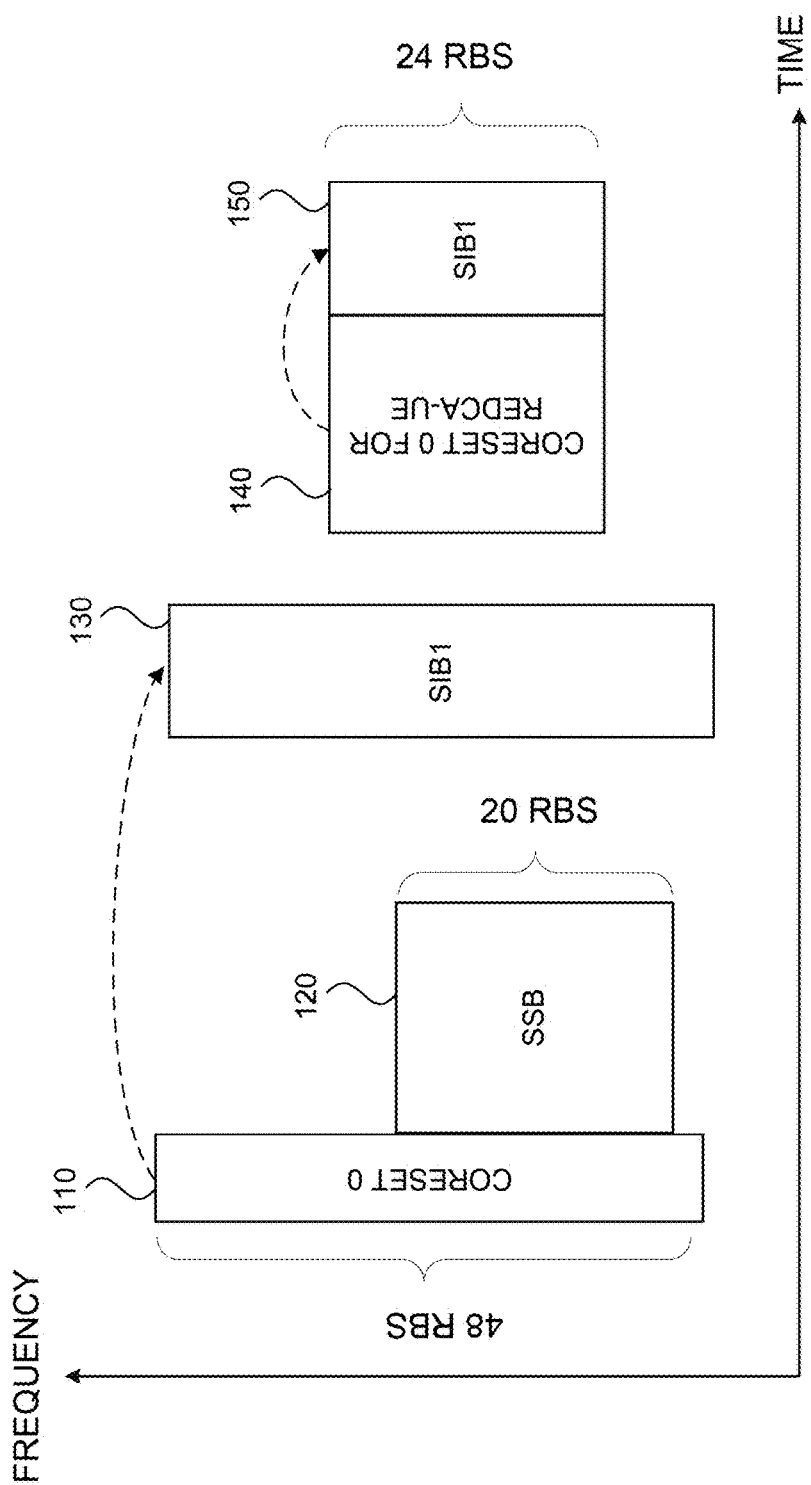
FIG. 1 illustrates a reduced bandwidth associated with a reduced bandwidth UE, in accordance with some aspects.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary aspects consistent with the disclosure. References in the Detailed Description to "one exemplary aspect," "an exemplary aspect," "an example exemplary aspect," etc., indicate that the exemplary aspect described may include a particular feature, structure, or characteristic, but every exemplary aspect does not necessarily include the particular feature, structure, or characteristic. Moreover, such phrases do not necessarily refer to the same exemplary aspect. Further, when the disclosure describes a particular feature, structure, or characteristic in connection with an exemplary aspect, those skilled in the relevant arts will know how to affect such feature, structure, or characteristic in connection with other exemplary aspects, whether or not explicitly described.

The exemplary aspects described herein provide illustrative examples and are not limiting. Other exemplary aspects are possible, and modifications may be made to the exemplary aspects within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the aspects. Aspects may also be implemented as instructions stored on a machine-readable medium and read and executed by one or more processors. A machine-readable medium includes any mechanism for storing or transmitting information in a form readable by a machine (e.g., a computing device). For example, in some aspects a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the wan "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary aspects will fully reveal the general nature of the disclosure so that others can, by applying knowledge of those skilled in relevant arts, readily modify and/or customize for various applications such exemplary aspects, without undue experimentation and without departing from the spirit and scope of the disclosure. Therefore, such modifications fall within the meaning and plurality of equivalents of the exemplary aspects based upon the teaching and guidance presented herein. Here, the phraseology or terminology serves the purpose of description, not limitation, such that the terminology or phraseology of the present specification should be interpreted by those skilled in relevant arts in light of the teachings herein.

Figure 9:
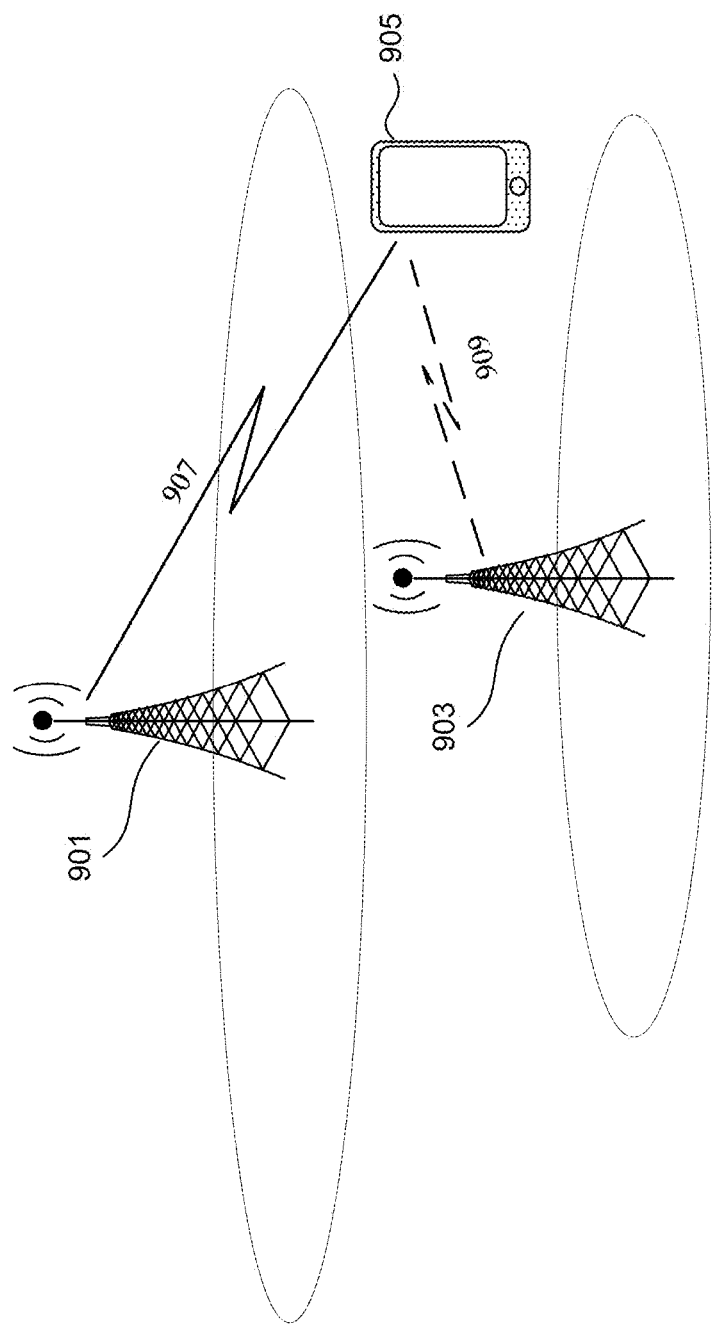
FIG. 9 illustrates an example system 900 implementing mechanisms for communications between an electronic device and a network, according to some aspects of the disclosure.

FIG. 9 illustrates an example system 900 implementing mechanisms for communication between an electronic device and a network, according to some aspects of the disclosure. Example system 900 is provided for the purpose of illustration only and does not limit the disclosed aspects. System 900 may include, but is not limited to, network nodes (for example, base stations such as eNBs) 901 and 903 and electronic device (for example, a UE) 905. Electronic device 905 (hereinafter referred to as UE 905) can include an electronic device configured to operate based on a wide variety of wireless communication techniques. These techniques can include, but are not limited to, techniques based on 3rd Generation Partnership Project (3GPP) standards. UE 905 can include, but is not limited to, as wireless communication devices, smart phones, laptops, desktops, tablets, personal assistants, monitors, televisions, wearable devices, Internet of Things (IoTs), vehicle's communication devices, and the like. Network nodes 901 and 903 (herein referred to as base stations) can include nodes configured to operate based on a wide variety of wireless communication techniques such as, but not limited to, techniques based on 3GPP standards.

According to some aspects, UE 905 is configured to communicate to base station 901 and/or the network associated with base station 901 (and/or 903). For example, before connecting to base station 901, UE 905 can search for a cell to attach. After completing the search, UE 905 can perform a Radio Resource Control (RRC) connection setup process. In one example, UE 905 can send an attach request to base station 901 and/or a mobility management entity (MME) (not shown) associated with base station 901. In some examples, the attach request can include an identifier of UE 905. In some aspects, if MME accepts the attach request, MME can send a setup request to, for example, base station 901. In some example, after receiving the setup request, and if base station 901 does not know the capabilities of UE 905, base station 901 can send a request to UE 905 to request the capabilities of UE 905. According to some aspects, UE 905 can send its capabilities to base station 901. In response, base station 901 can send an RRC connection reconfiguration message back to UE 905. Then UE 905 can start data communication using base station 901.

Figure 10:
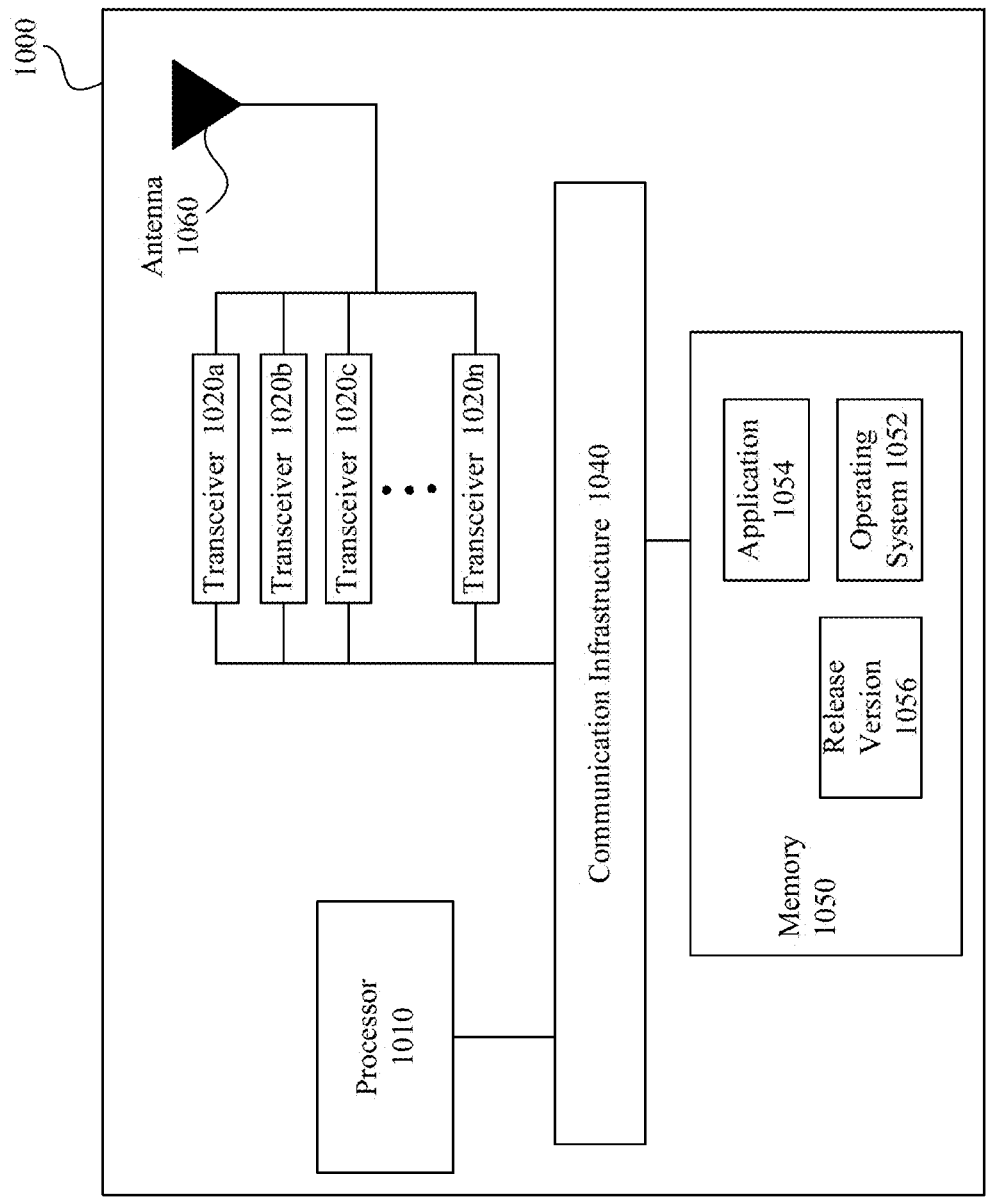
FIG. 10 illustrates a block diagram of an example system of an electronic device implementing communications, according to some aspects of the disclosure.

FIG. 10 illustrates a block diagram of an example system 1000 of an electronic device implementing mechanisms for communications, according to some aspects of the disclosure. System 1000 may be any of the electronic devices (e.g., base stations 101, 103, UE 105) of system 100. System 1000 includes processor 1010, one or more transceivers 1020a-1020n, communication infrastructure 1040, memory 1050, operating system 1052, application 1054, and antenna 1060. Illustrated systems are provided as exemplary parts of system 1000, and system 1000 can include other circuit(s) and subsystem(s). Also, although the systems of system 1000 are illustrated as separate components, the aspects of this disclosure can include any combination of these, less, or more components.

Memory 1050 may include random access memory (RAM) and/or cache, and may include control logic (e.g., computer software) and/or data. Memory 1050 may include other storage devices or memory such as, but not limited to, a hard disk drive and/or a removable storage device/unit. According to some examples, operating system 1052 can be stored in memory 1050. Operating system 1052 can manage transfer of data from memory 1050 and/or one or more applications 1054 to processor 1010 and/or one or more transceivers 1020a-1020n. In some examples, operating system 1052 maintains one or more network protocol stacks (e.g., Internet protocol stack, cellular protocol stack, and the like) that can include a number of logical layers. At corresponding layers of the protocol stack, operating system 1052 includes control mechanism and data structures to perform the functions associated with that layer.

According to some examples, application 1054 can be stored in memory 1050. Application 1054 can include applications (e.g., user applications) used by wireless system 1000 and/or a user of wireless system 1000. The applications in application 1054 can include applications such as, but not limited to, Siri™, FaceTime™, radio streaming, video streaming, remote control, and/or other user applications.

System 1000 can also include communication infrastructure 1040. Communication infrastructure 1040 provides communication between, for example, processor 1010, one or more transceivers 1020a-1020n, and memory 1050. In some implementations, communication infrastructure 1040 may be a bus. Processor 1010 together with instructions stored in memory 1050 performs operations enabling system 200 of system 100 to implement mechanisms for communication, as described herein. Additionally, or alternatively, one or more transceivers 1020a-1020n perform operations enabling system 1000 of system 100 to implement mechanisms for communication, as described herein.

One or more transceivers 1020a-1020n transmit and receive communications signals that support mechanisms for communications, according to some aspects, and may be coupled to antenna 1060. Antenna 1060 may include one or more antennas that may be the same or different types. One or more transceivers 1020a-1020n allow system 1000 to communicate with other devices that may be wired and/or wireless. In some examples, one or more transceivers 1020a-1020n can include processors, controllers, radios, sockets, plugs, buffers, and like circuits/devices used for connecting to and communication on networks. According to some examples, one or more transceivers 1020a-1020n include one or more circuits to connect to and communicate on wired and/or wireless networks.

Additionally, one or more transceivers 1020a-1020n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 1020a-1020n can be configured to operate according to one or more of Rel-15, Rel-16, Rel-17, or later of 3GPP standard.

According to some aspects of this disclosure, processor 1010, alone or in combination with computer instructions stored within memory 1050, and/or one or more transceiver 1020a-1020n, implements the communication approaches as discussed herein. For example, transceiver 1020a can enable connection(s) and communication over a first carrier (for example, carrier 907 of FIG. 9). In this example, transceiver 1020b can enable detecting and/or measuring a second carrier (for example, carrier 909 of FIG. 9), transceiver 1020c can enable detecting and/or measuring a third carrier, and transceiver 1020n can enable detecting and/or measuring a fourth carrier, concurrently. As discussed above, the first, second, third, and fourth carriers can be associated to same or different base stations.

Additionally, or alternatively, wireless system 1000 can include one transceiver configured to operate at different carriers. Processor 1010 can be configured to control the one transceiver to switch between different carriers, according to some examples.

According to some aspects of this disclosure, processor 1010, alone or in combination with computer instructions stored within memory 1050, and/or one or more transceiver 1020a-1020n, implements mechanisms for communication, as described herein. Although the operations discussed herein are discussed with respect to processor 1010, it is noted that processor 1010, alone or in combination with computer instructions stored within memory 1050, and/or one or more transceiver 1020a-1020n, can implement these operations. For example, processor 1010 is configured to communicate system 1000 to a base station (and/or a network associated with the base station) as a per-UE capability, during an initial communication discussed above (or any other initial access). Processor 1010 can use a RRC layer signaling, a MAC layer, and/or a PHY layer signaling to communicate as a per-UE capability.

In a Radio Access Network (RAN) 86 Technical Specification Group meeting, a new work item ("WI") entitled "Support of Reduced Capability NR Devices" was approved. The purpose of this work item is to study a user equipment (UE) feature and parameter list associated with UEs having lower end capabilities, relative to 3GPP Release 16 enhanced Mobile Broadband ("eMBB") and Ultra Reliable Low Latency Communications ("URLLC") New Radio ("NR".) Three use cases were identified in the work item, including industrial wireless sensors, video surveillance devices, and wearables devices. More specifically, a list of potential UE reduction features was identified for further study, the list including: (1) UEs having a reduced number of UE RX/TX antennas; (2) UEs having a reduced bandwidth; (3) half-duplex-FDD transmission; (4) UEs requiring a relaxed processing time; and (5) UEs requiring a relaxed processing capability.

Turning to the item of UEs having a reduced bandwidth, it is noted that the 3GPP Rel-15 Control Resource Set ("CORESET") 0 bandwidth can be up to 17 MHz. This CORESET bandwidth is potentially larger than the maximum bandwidth ("BW") targeted for reduced capability UEs (REDCA-UE). In an exemplary aspect, a reduced capability UE may have a bandwidth of 10 MHz. In another exemplary aspect, a reduced capability UE may have a bandwidth of 5 MHz. One of ordinary skill in the art will recognize that these particular bandwidths are examples of possible bandwidths, and are not limitations of the underlying principles described herein. Given the reduced bandwidths of these UEs, the challenge confronted by the inventors was how to design the Physical Downlink Control Channel (PDCCH) transmission to schedule system information transmission that can be received by these UEs. An additional challenge is how to efficiently multiplex resources between REDCA-UE and legacy UEs. In this additional challenge, the inventors studied how to maximize the resource efficiency in putting forward possible solutions to the challenges.

FIG. 1 illustrates a reduced bandwidth associated with a reduced bandwidth UE, in accordance with some aspects. In the illustrated aspect, for a regular UE, CORESET 110 is shown as having 48 resource blocks (RBs), and synchronization signal block (SSB) 120 having 20 RBs. For the regular UE, system information block (SIB1) is also shown, which provides system information (SI) for the UE. Also, in FIG. 1, for a reduced capability UE, CORESET 140 is shown associated with SIB1 150, and for this example, 24 RBs.

According to certain aspects of this disclosure, a frequency hopping approach may be used in the design of the PDCCH transmissions to schedule system information transmission to reduced capability UEs. In some aspects, the frequency-hopping CORESET with a predefined hopping pattern may be configured by higher layers, e.g., radio resource control (RRC) signaling or media access control (MAC) Control Element (CE). This higher layer configuration may be done on a per CORESET per UE, or on a purely per UE basis. In further aspects of the frequency hopping approach, a check may be made to ensure sufficient bandwidth is available. When such a check is performed, frequency hopping may be enabled based on the bandwidth of CORESET and on a corresponding component carrier (CC) bandwidth.

A wide variety of examples fall within the scope of a frequency hopping approach for the designs of PDCCH transmission for reduced capability UEs. In some designs, the set of sub-bands (S) for CORESET hopping may span the entire downlink system bandwidth. In other designs, the set of sub-bands (S) for CORESET hopping may span a subset of the downlink system bandwidth.

Figure 2:
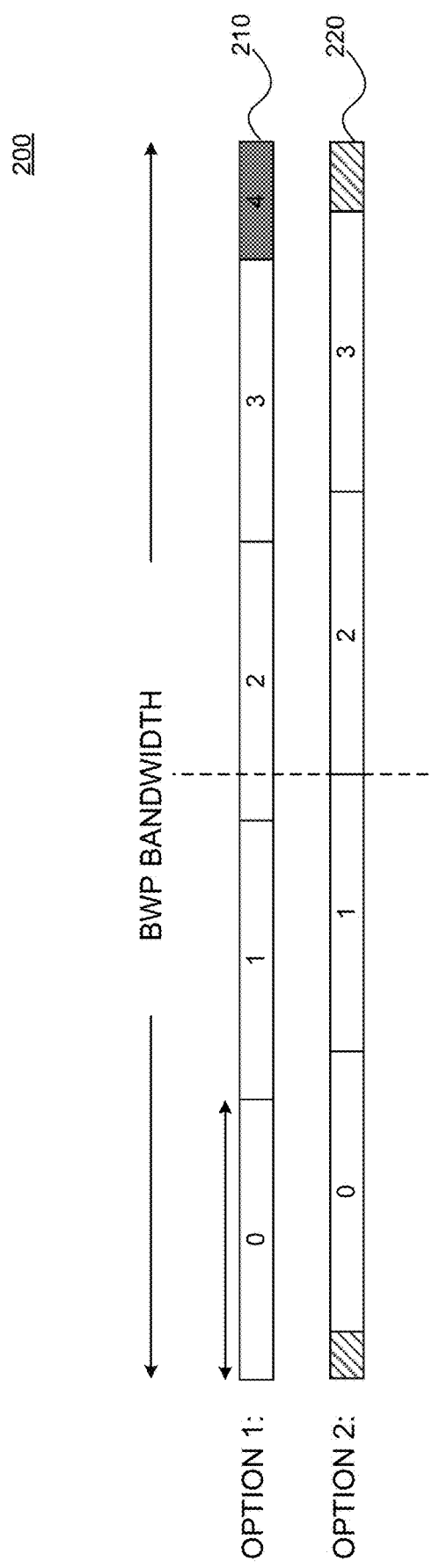
FIG. 2 illustrates a set of sub-bands for CORESET frequency hopping, in accordance with some aspects.

A sub-band is a set of k contiguous physical resource blocks (PRBs). In one aspect, k is either a function of component carrier (CC) bandwidth or a function of bandwidth part (BWP) bandwidth or configured by higher layers e.g. RRC signaling on a per UE or per CORESET basis. In some other design aspects, k is the reduced bandwidth of the REDCA-UE. At least two options are available in terms of the definition of the possible sub-bands, as illustrated in FIG. 2. In the first option 210 in FIG. 2, the last sub-band in set S may have fewer than k contiguous PRBs depending on the corresponding CC or BWP bandwidth. In this option, assuming sub-bands are limited within a BWP, the number of sub-bands given by $N_{BWP,i}^{size}$ as follows:

$N$ is defined by ceiling($N_{BWP,i}^{size}/k$)

In this aspect, the sub-bands may be indexed in the order of increasing frequency and non-increasing sizes, starting at the lowest frequency.

In the second option 220 in FIG. 2, the number of sub-bands is given as follows:

$N=\text{floor}(N_{BWP,i}^{size}/k)$

In this second option 220, the remaining resource block (RBs) are evenly divided at the two ends of the active BWP, as illustrated in FIG. 2 (220). In some design aspects, the sub-band overlapping with the synchronization signal blocks (SSBs) may be excluded for CORESET frequency hopping.

Figure 3:
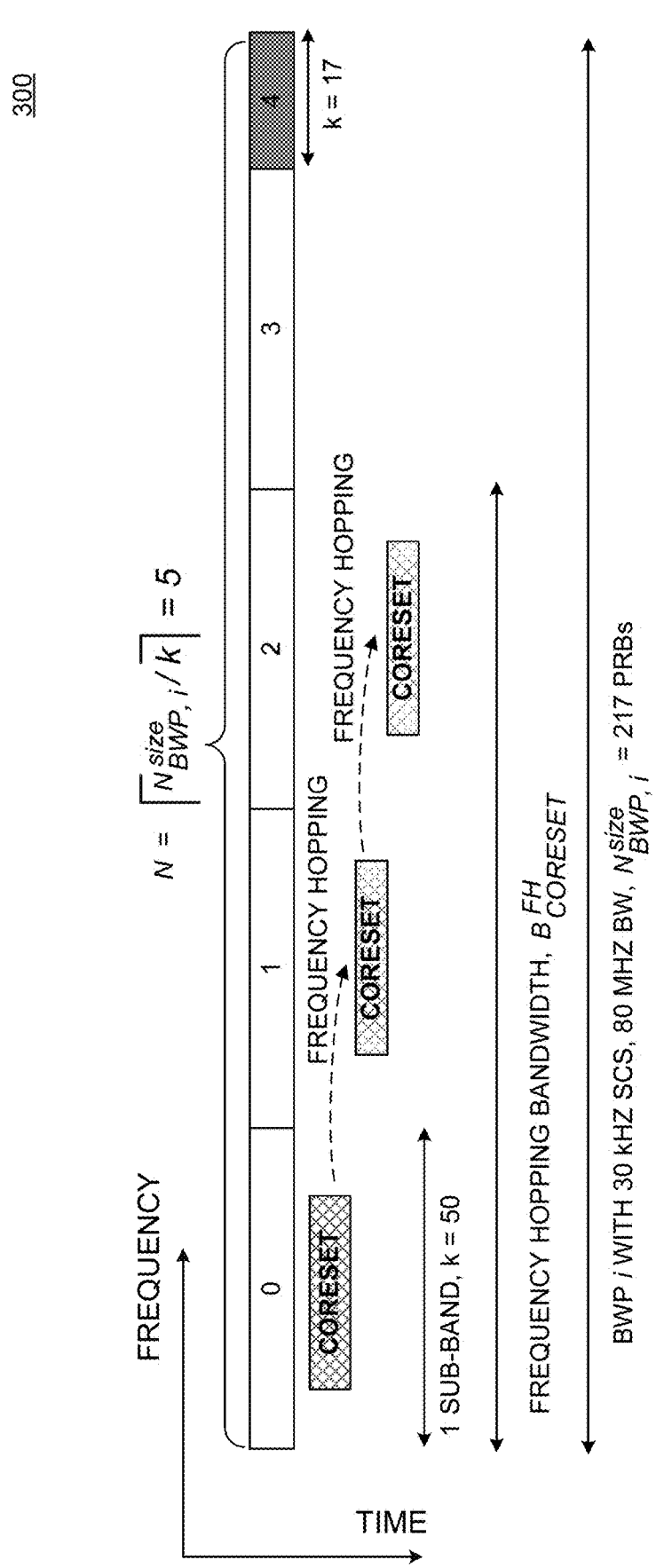
FIG. 3 illustrates a sub-band layout of frequency hopping regions, in accordance with some aspects.

FIG. 3 illustrates an exemplary sub-band layout for CORESET frequency-hopping (FH). In the example, FIG. 3 shows five sub-bands, with a nominal size of each sub-band being 50 PRBs (k). The BWP size is 80 MHz with 217 PRBs, with the result that the last sub-band size is 17 PRBs. In the example of FIG. 3, the frequency hopping bandwidth spans sub-bands 0 through 2. FIG. 3 illustrates one example of frequency hopping, and persons of ordinary skill in the art will recognize other variations on the underlying principle indicated in the example of FIG. 3.

More generally, in certain aspects, a sub-band is valid for CORESET frequency hopping if the sub-band size $N_{sub-band,j}^{size}$ is larger than or equal to RBs of CORESET $N_{RB}^{CORESET}$, which is configured by higher layers. An exemplary high layer configuration approach is to use RRC signaling to accomplish this configure. Referring back to the example illustrated in FIG. 3, the last sub-band (identified as #4) is invalid for CORESET hopping operation, if $N_{RB}^{CORESET}>17$ in accordance with this rule.

Figure 4:
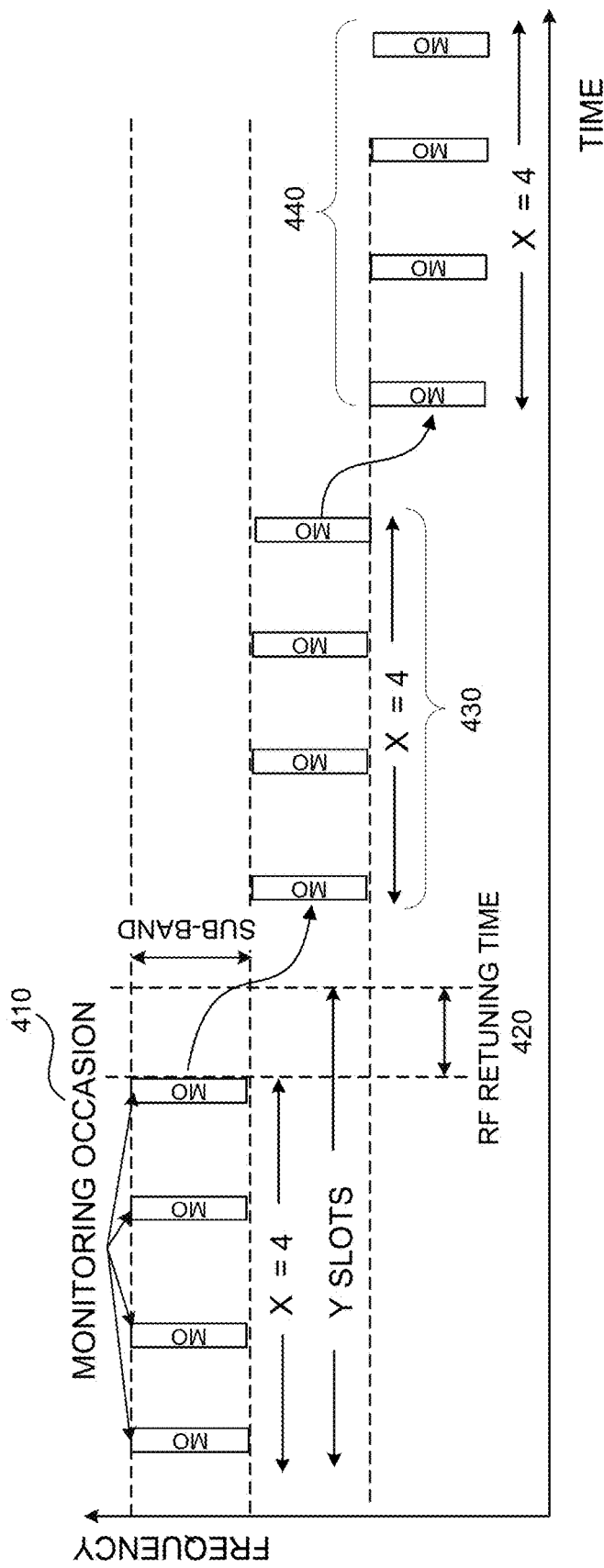
FIG. 4 illustrates a frequency-hopping pattern in the time domain, in accordance with some aspects.

It is noted that in various design aspects, a UE may be configured with frequency hopping bandwidth $B_{CORESET}^{FH}$ is through higher layers, for example using RRC signaling. Depending on the higher layer configuration, this configuration may limit the range of RBs for CORESET frequency hopping operation. For example, in one aspect, where $B_{CORESET}^{FH} \leq N_{sub-band,j}^{size}$, the frequency hopping for a CORESET may be disabled. Alternatively, in another example, the frequency hopping for CORESET may be disabled or enabled explicitly as part of CORESET configuration through RRC signaling. Again, referring to the example shown in FIG. 3, the frequency hopping of CORESET may be limited within the sub-bands 0/1/2/3, where $B_{CORESET}^{FH}=3$ FIG. 4 illustrates an exemplary CORESET frequency hopping pattern in the time domain, in accordance with various aspects. In FIG. 4, a number of PDCCH monitoring occasions 410 are shown while the frequency hopping is in a first sub-band. In other words, there is no frequency hopping or frequency hopping is temporally disabled for PDCCH monitor occasions 410. FIG. 4 also shows a number of monitoring occasions 430 at a later time, where the frequency hopping has moved to a second sub-band. FIG. 4 also shows a number of monitoring occasions 440 at another later time, where the frequency hopping has moved to a third sub-band. According to certain aspects of this disclosure, and as illustrated in FIG. 4, when frequency hopping is enabled for a CORESET, the same PRB locations are used for at least X PDCCH monitoring occasions (MOs) 410 for a search space that is associated with the CORESET. In FIG. 4, X takes the value 4. Keeping PDCCH monitoring occasions 410 in the same PRB locations without frequency hopping is important to allow cross-slot/cross-MOs channel estimation to improve the PDCCH decoding performance In certain design aspects, a same precoding matrix is assumed on a "per antenna port" basis across the X monitoring occasions that are located within the same PRBs without frequency hopping in order to operate cross-MOs channel estimation.

In various aspects, the value of X may be separately configured on a per search space set (SSS) or per SSS basis group basis, e.g., at least depending on the periodicity of configured SSS. For the group basis configuration approach, the SSS may be divided into different groups first, and each group is configured with a X value for frequency hopping operation.

In another aspect, a UE may be configured with another parameter 'Y' to accommodate the re-tuning time 420. The CORESET frequency location should be switched every Y consecutive slots. More specifically, Y≥X., as illustrated in FIG. 4.

Figure 6:
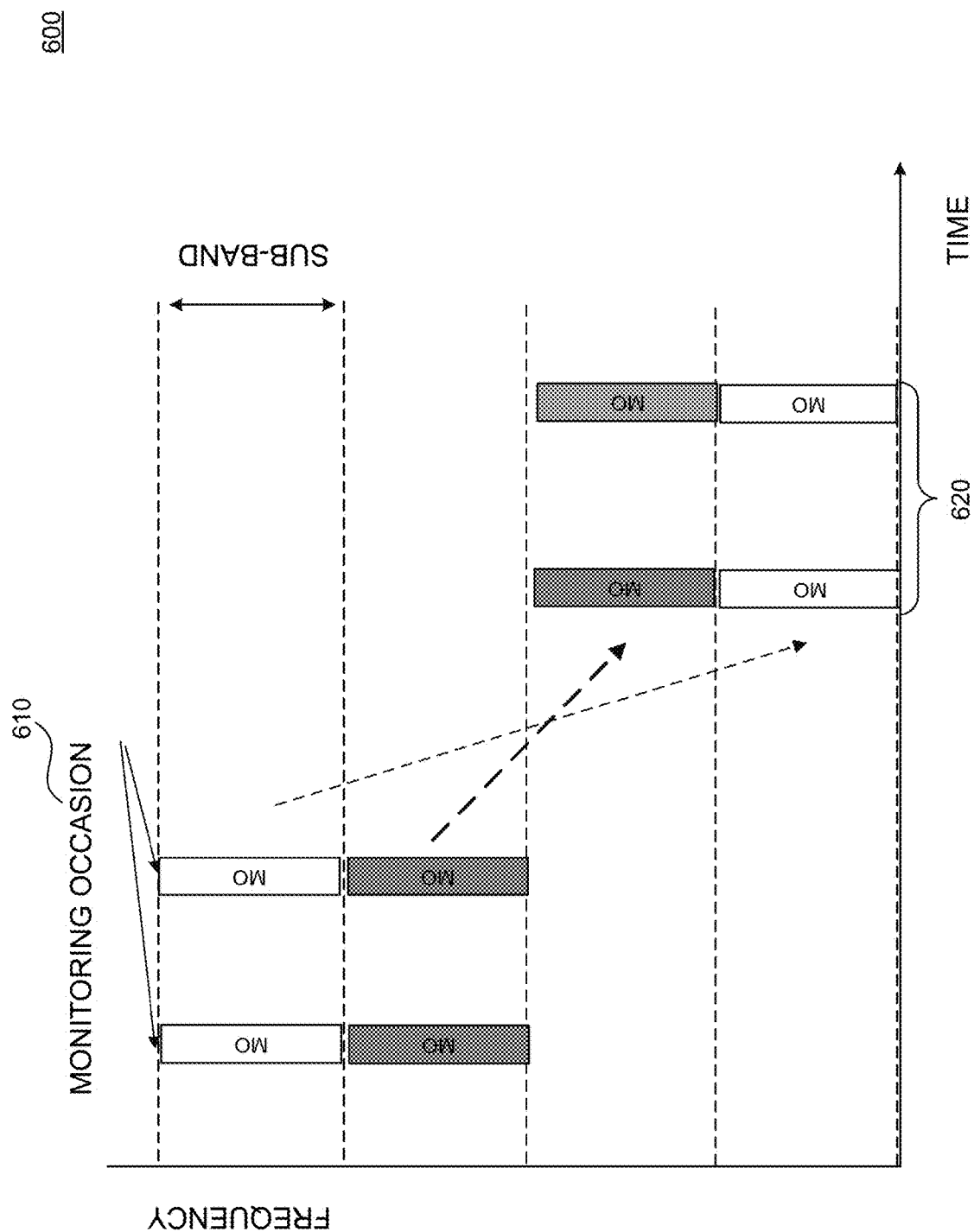
FIG. 6 illustrates a minoring approach for monitoring occasions, in accordance with some aspects.

With the sub-bands determined for CORESET frequency hopping, several approaches may be used to design frequency hopping patterns for CORESET transmissions. FIGS. 5 and 6 illustrate one exemplary frequency hopping pattern for CORESET transmissions. In this exemplary aspect, the PRBs for CORESETs may be mirrored with respect to the central frequency of active BWP. The mathematical relationship describing the mirroring process is illustrated in FIG. 5. Thus, in such a mirroring process, the sequence in the patterns of sub-bands used by the frequency hopping toggles from high to low to high, as one steps through the sequence. In FIG. 5, i represents the PDCCH monitoring index in stepping through the frequency hopping sequence, and X represents the total number of steps in the complete frequency hopping sequence. As FIG. 5 illustrates, the formula for the location of the PRB for the CORESET at any particular step in the frequency hopping sequence toggles between two sub-formula, depending on whether the index generates an even number or an odd number. The two sub-formula reflect the mirroring approach that is further illustrated in FIG. 6.

FIG. 6 illustrates the frequency hopping sequence over time that step from a high sub-band to a low-sub-band, where the high sub-band and the low sub-band are mirror images about a central point in the available bandwidth. Corresponding monitoring occasions 610, 620 are respectively shown. Two examples are shown in FIG. 6, where one high-low sub-band pair are at the extremes of the available bandwidth, while the other high-low sub-band pair are closer to the central point in the available bandwidth. Each approach has benefits that include frequency diversity, and better handling of either a UE that is moving at a high speed, or a UE that is relatively low in its mobility:

FIG. 6 shows a first aspect of a frequency hopping pattern. In a second aspect of the frequency hopping pattern of CORESET patterns, the CORESET associated with monitoring occasion i may be mapped using the following formula for sub-band $n_{SB}^{(i)}$:

$$n_{SB}^{(i)} = \left(n_{SB}^{(i_0)} + \left(\left\lfloor \frac{i}{X} \right\rfloor - j_0\right) \text{mod} N_{SB,hop}^{CORESET}\right) \cdot f_{SB,hop}^{CORESET} \text{mod} N_{SB}^{DL}$$

$$j_0 = \lfloor i_0/X \rfloor$$

$$i_0 \leq i$$

wherein:
X is number of monitoring occasions over which CORESETS stays at the same sub-bands before hopping to another sub-band;
$i_0$ is the first PDCCH monitoring occasion;
$N_{SB,hop}^{CORESET}$ represents the number of sub-bands over which CORESET frequency hops;
$f_{SB,hop}^{CORESET}$ represents the sub-band offsets between one sub-band and the next sub-band a CORESET hopes to, expressed as a number of DL sub-bands; and
$N_{SB}^{DL}$ is the total number of DL sub-bands.

In a third aspect for the frequency hopping patterns, a random parameter $R_{p,i}$ may be added to the determination of sub-band $n_{SB}^{(i)}$ to avoid continuous PDCCH transmission blocking for a given CORESET p.

$$n_{SB}^{(i)} = \left( n_{SB}^{(i_0)} + \left( \left\lfloor \frac{i}{X} \right\rfloor - j_0 \right) \bmod N_{SB,hop}^{CORESET} \right) \cdot f_{SB,hop}^{CORESET} + R_{p,\lfloor \frac{i}{X} \rfloor} \bmod N_{SB}^{DL}$$

In one particular example of the random parameter aspect, $R_{p,i}=(K*R_{p,i-1}) \bmod(D), R_{p,-1}=n_{RNTI}$, K=39827, D=65537.

In this aspect, CORESET frequency hopping pattern is defined in a UE-specific manner and the CORESETs associated with different UEs may hop to different sub-bands in the next hop, and hence collision between the different UEs may be addressed.

In another aspect, the random parameter may be set as follows: $R_{p,i}=N_{ID}^{cell}$, where $=N_{ID}^{cell}$ is the physical layer cell identity. With this approach, the collision between CORESETs of different cells can be minimized since different sub-bands may be used in the next hop after collisions.

Figure 7:
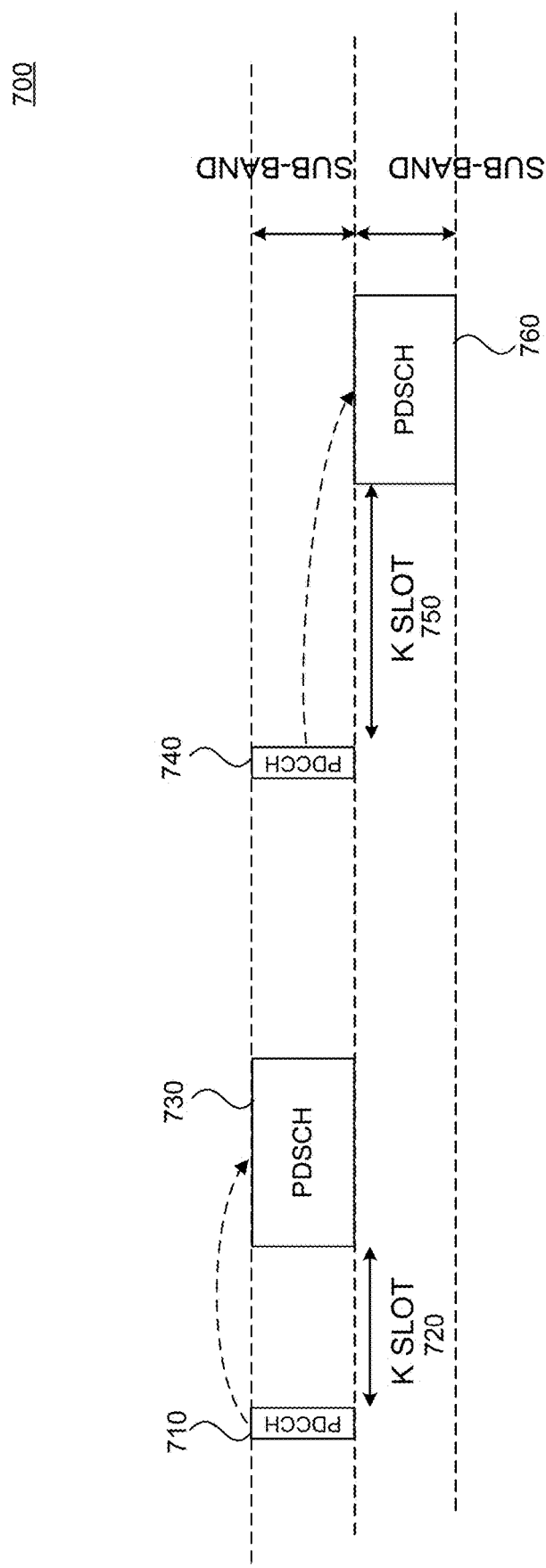
FIG. 7 illustrates PDSCH transmissions with frequency hopping PDCCH, in accordance with some aspects.

In some other design aspects, the $R_{p,i}=\sum_{k=0}^{7} c(8l+k)$, where $c(n)=(x_1(n+N_c)+x_2(n+N_c))) \bmod 2, x_1(n+31)=(x_1(n+3)+x_1(n)) \bmod 2;$ $x_2(n+31)=(x_2(n+3)+x_2(n+2)+x_2(n)) \bmod 2;$ FIG. 7 illustrates different possible sub-band locations of physical data shared channel (PDSCH), in accordance with certain aspects of this disclosure. In one type of location, PDCCH 710 is transmitted in one sub-band, with PDSCH 730 appearing after k slots 720 in the same sub-band. In another type of location, PDCCH 740 is transmitted in one sub-band, with PDSCH 760 appearing after k slots 750 in a different sub-band.

More generally, the sub-band location of PDSCH that is scheduled by Physical Downlink Control Channel (PDCCH). In various aspects of the present disclosure, the sub-band location of PDSCH may be determined in various ways as follows.

In a first option, the location is indicated by means of downlink control information (DCI) format. In one aspect, one information field such as a sub-band indicator field (SIF) may be included in the DCI format to indicate the sub-band and additionally indicate the resource allocation within the sub-band.

In a second option, a same sub-band location as the associated PDCCH monitoring (i.e., SSS and CORESET) is assumed for PDSCH without the need for explicit signaling. This option is beneficial since it avoids dynamic switching and retuning glitch. However, this option does cause scheduling flexibility loss.

In other design aspects, the PDSCH may start from the slot n+k where n is the last slot for PDCCH transmission. In a first option, the k value is fixed or configured by higher layers (e.g., RRC or MAC Control Element (CE)) on a per UE basis to be 1 or 2. If k=2, PDSCH is allowed to use a different sub-band from the associated PDCCH. If k=1, PDSCH is limited to be same sub-band of the associated PDCCH. This is illustrated in FIG. 7, as discussed above.

In a second option, the k value is variable and its value is signaled by the DCI format. More importantly, the UE is allowed to provide a preferred minimal K value to gNB through RRC signaling. The UE does not expect the signaled K in DCI format is smaller than the K reported by UE.

Figure 8:
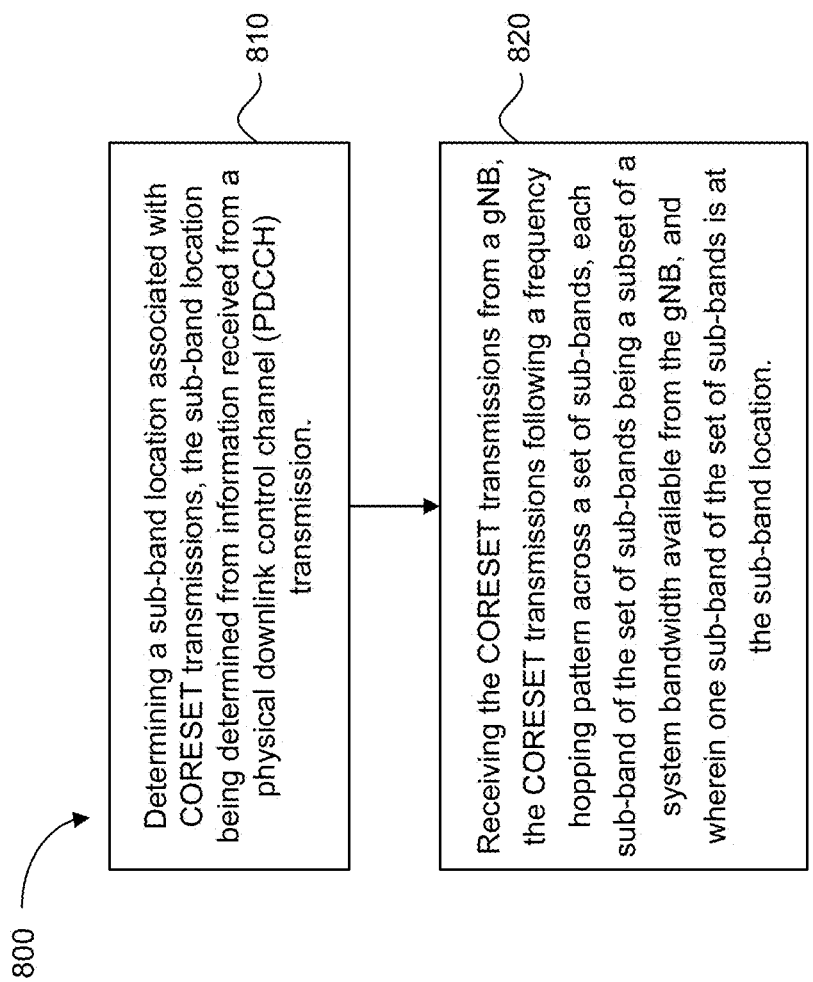
FIG. 8 depicts an example procedure for practicing the various aspects discussed herein.

FIG. 8 illustrates a flowchart diagram of a method 800 for method for communication by a user equipment (UE) with reduced bandwidth capability, where the method includes the following steps. Step 810 of the method includes determining a sub-band location associated with CORESET transmissions, the sub-band location being determined from information received from a physical downlink control channel (PDCCH) transmission. Step 820 of the method includes the step of receiving the CORESET transmissions from a gNB, the CORESET transmissions following a frequency hopping pattern across a set of sub-bands, each sub-band of the set of sub-bands being a subset of a system bandwidth available from the gNB, and wherein one sub-band of the set of sub-bands is at the sub-band location.

Figure 11:
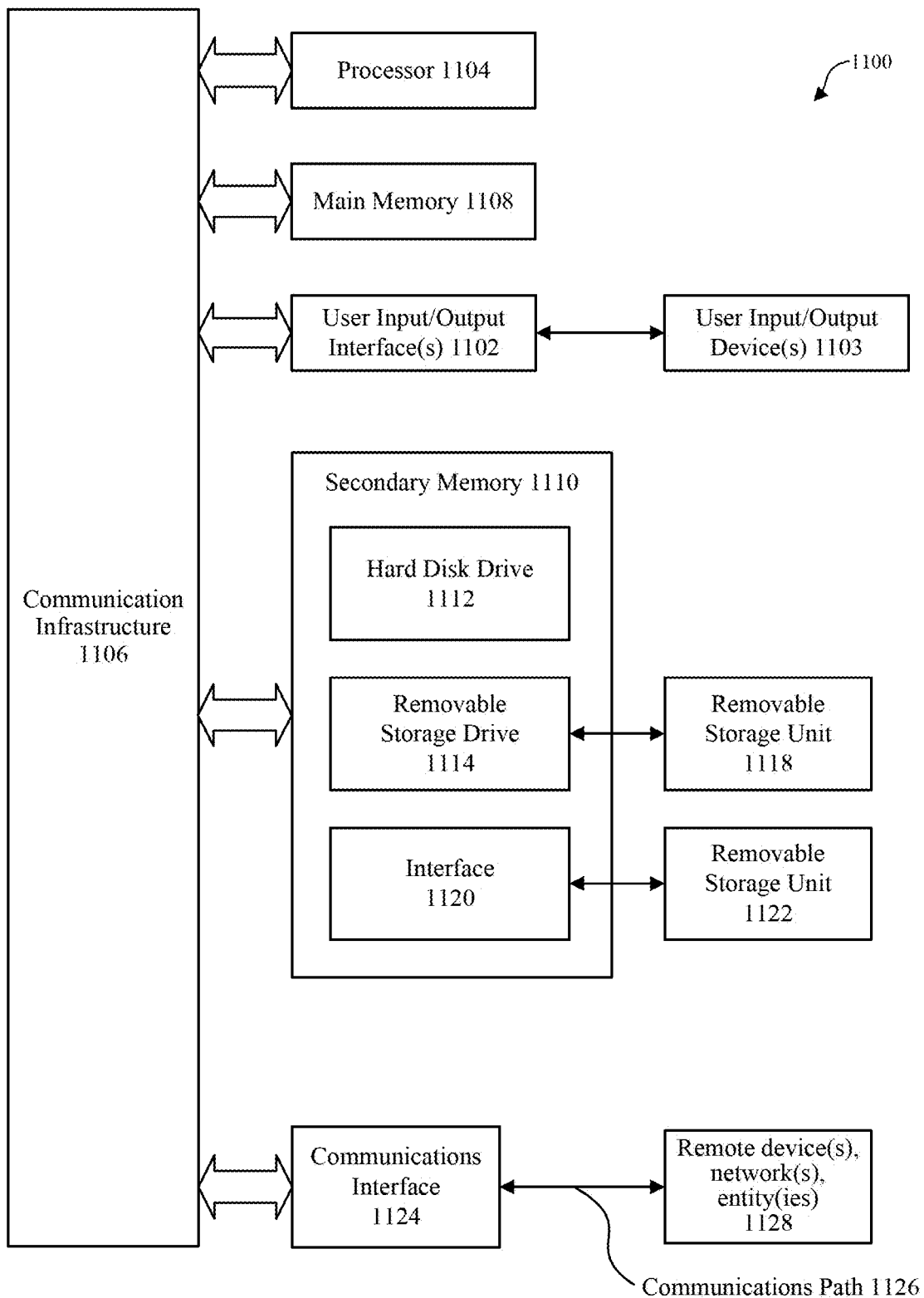
FIG. 11 is an example computer system for implementing some aspects or portion(s) thereof.

Various aspects can be implemented, for example, using one or more computer systems, such as computer system 1100 shown in FIG. 11. Computer system 1100 can be any well-known computer capable of performing the functions described herein such as devices 901, 903, 905 of FIG. 9, or 1000 of FIG. 10. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some aspects, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 11. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A user equipment (UE) having a reduced bandwidth capability, the UE comprising:
    a receiver configured to receive control resource set (CORESET) transmissions from a gNB, the CORESET transmissions following a frequency hopping pattern across a set of sub-bands, each sub-band of the set of sub-bands being a subset of a system bandwidth available from the gNB; and
    processor circuitry configured to:
    determine a sub-band location associated with the CORESET transmissions, the sub-band location determined from information received from a physical downlink control channel (PDCCH) transmission, and
    control the receiver according to the determined sub-band location,
    wherein the frequency hopping pattern is based on a randomization parameter for determination of each sub-band such that continuous PDCCH transmission blocking is avoided.

2. The UE of claim 1, wherein the frequency hopping pattern includes a pattern mirrored with respect to a central frequency of an active bandwidth part (BWP).

3. The UE of claim 1, wherein the sub-band location is determined by adding a random value to an index, the index being based on a number of monitoring occasions the CORESET transmissions stay at a same sub-band before hopping to another sub-band, a number of sub-bands used in the frequency hopping pattern, a sub-band offset between consecutive sub-bands, and a total number of downlink (DL) sub-bands.

4. The UE of claim 3, wherein the random value is obtained by multiplication, by a first integer, of a previous random value, followed by a modulo operation using a second integer.

5. The UE of claim 1, wherein the frequency hopping pattern further includes frequency hopping having a frequency hopping window that includes a number of consecutive PDCCH monitoring occasions.

6. The UE of claim 1, wherein the receiver retunes between sub-bands, and the processor circuitry includes an allowance for retuning time in its processing.

7. The UE of claim 1, wherein the information received from the physical downlink control channel (PDCCH) transmission is in a sub-band indicator field (SIF) in a download control information (DCI) format.

8. The UE of claim 1, wherein the sub-band location is based on a last slot of the PDCCH transmission.

9. A method for communication by a user equipment (UE) having a reduced bandwidth capability, the method comprising:

determining a sub-band location associated with CORESET transmissions, the sub-band location being determined from information received from a physical downlink control channel (PDCCH) transmission; and receiving the CORESET transmissions from a gNB, the CORESET transmissions following a frequency hopping pattern across a set of sub-bands, each sub-band of the set of sub-bands being a subset of a system bandwidth available from the gNB, and wherein one sub-band of the set of sub-bands is at the sub-band location, wherein the frequency hopping pattern is based on a randomization parameter for determination of each sub-band such that continuous PDCCH transmission blocking is avoided.

10. The method of claim 9, wherein the frequency hopping pattern includes a pattern mirrored with respect to a central frequency of an active bandwidth part (BWP).

11. The method of claim 9, wherein the sub-band location is determined by adding a random value to an index, the index being based on a number of monitoring occasions the CORESET transmissions stay at a same sub-band before hopping to another sub-band, a number of sub-bands used in the frequency hopping pattern, a sub-band offset between consecutive sub-bands, and a total number of downlink (DL) sub-bands.

12. The method of claim 11, wherein the random value is obtained by multiplication, by a first integer, of a previous random value, followed by a modulo operation using a second integer.

13. The method of claim 9, further comprising:
retuning between sub-bands,
wherein the determining the sub-band location includes an allowance for retuning time in the determining.

14. The method of claim 9, wherein the information received from the physical downlink control channel (PDCCH) transmission is in a sub-band indicator field (SIF) in a download control information (DCI) format.

15. The method of claim 9, wherein the sub-band location is based on a last slot of the PDCCH transmission.

16. A non-transitory computer-readable media comprising instructions to cause an electronic device, upon execution of the instructions by one or more processors of the electronic device, to perform one of more elements of a method, the method comprising:

determining a sub-band location associated with CORESET transmissions, the sub-band location being determined from information received from a physical downlink control channel (PDCCH) transmission; and causing to receive the CORESET transmissions from a gNB, the CORESET transmissions following a frequency hopping pattern across a set of sub-bands, each sub-band of the set of sub-bands being a subset of a system bandwidth available from the gNB, and wherein one sub-band of the set of sub-bands is at the sub-band location, wherein the frequency hopping pattern is based on a randomization parameter for determination of each sub-band such that continuous PDCCH transmission blocking is avoided.

17. The non-transitory computer-readable media of claim 16, wherein the frequency hopping pattern includes a pattern mirrored with respect to a central frequency of an active bandwidth part (BWP).

18. The non-transitory computer-readable media of claim 16, wherein the sub-band location is determined by adding a random value to an index, the index being based on a number of monitoring occasions the CORESET transmissions stay at a same sub-band before hopping to another sub-band, a number of sub-bands used in the frequency hopping pattern, a sub-band offset between consecutive sub-bands, and a total number of downlink (DL) sub-bands.

19. The non-transitory computer-readable media of claim 16, wherein the information received from the physical downlink control channel (PDCCH) transmission is in a sub-band indicator field (SIF) in a download control information (DCI) format.

20. The non-transitory computer-readable media of claim 16, wherein the sub-band location is based on a last slot of the PDCCH transmission.

* * * * *